United States Patent [19]

Brooks

[11] Patent Number: 4,823,402
[45] Date of Patent: Apr. 18, 1989

[54] AGILE OPTICAL BEAM STEERING SYSTEM

[75] Inventor: Robert E. Brooks, Manhattan Beach, Calif.

[73] Assignee: TRW Inc., Redondo Beach, Calif.

[21] Appl. No.: 853,836

[22] Filed: Apr. 21, 1986

[51] Int. Cl.[4] .............................................. H04B 9/00
[52] U.S. Cl. ................................... 455/607; 350/6.9; 358/207; 358/231; 455/604; 455/617
[58] Field of Search ............... 455/604, 617, 619, 618, 455/606, 607; 356/4, 5, 1; 250/203 R; 358/104, 87, 206, 207, 231, 232, 233, 88, 208, 199; 350/6.1, 6.5, 6.6, 6.7, 6.9, 6.91

[56] References Cited

U.S. PATENT DOCUMENTS 3,615,135 10/1971 Frazer .................................. 455/604
4,297,723 10/1981 Whitby ................................. 358/87
4,574,197 3/1986 Kliever ................................ 350/6.7

OTHER PUBLICATIONS

Wolf–"Precision Pointing"–Proceedings of SPIE vol. 150–Laser & Fiber Optic Comm. 1978 pp. 9–14, San Diego Calif.
Mooradian–Atmospheric, Space & Underwater Optical Comm–Proc. of SPIE vol. 150–Laser & Fiber Optic Comm. 1978, pp. 83–91, San Diego Calif.

Primary Examiner—Robert L. Griffin
Assistant Examiner—Leslie Van Beek
Attorney, Agent, or Firm—Noel F. Heal; Sol L. Goldstein

[57] ABSTRACT

A beam deflection system for use in optical radar, communications, or optical display apparatus, having the ability to scan multiple "target" clusters that are widely scattered over a large angular field. In its transmission mode of operation, the system switches a laser beam sequentially across an array of focal elements, moving the beam at high speed, since total beam movement across the array is limited to only a few degrees. The system includes an expansion telescope, which expands the succession of beams from the array of focal elements and directs them onto an array of larger, movable optical elements, such as gimbaled mirrors, which direct the successive beams toward scattered target areas in a large angular field. The system also includes a beam scanning device, for "microscanning" the beam through a number of separately resolvable positions within the field of view of each of the array of focal elements.

48 Claims, 4 Drawing Sheets

AGILE OPTICAL BEAM STEERING SYSTEM

BACKGROUND OF THE INVENTION

This invention relates generally to optical beam deflection systems and, more particularly, to optical beam deflection systems suitable for use in optical radar, target designation, communications or optical display apparatus. Optical radar is a term used to describe apparatus for detecting the position of "target" objects using electromagnetic radiation at optical frequencies, including ultraviolet and infrared frequencies. Target designation involves the illumination of selected targets so that they can be identified and tracked by other independent systems. Optical beams used in radar and similar apparatus are typically transmitted as high-energy coherent beams, which must be deflected by some means in a rapid manner if multiple targets are to be addressed in a short period of time. There is a similar requirement for rapidly selecting received optical beams in a receiver system.

A special problem arises if the apparatus must process information relating to a large angular field. This is typically the situation that exists in a radar application, in which there are a number of "targets," each of a relatively small angular size, sparsely populating a large angular field. Practically the same situation exists in some communications applications, in which communications "targets," such as satellites, are scattered across a wide angular field of view. Similarly, in some optical display systems it may be desirable to display multiple independently movable images on a display screen, using one or more optical beams that are rapidly scanned across a wide angular field of view.

In each case, the optical beam deflection system must deflect an optical beam through relatively large angles, and there is a requirement for both a high speed of deflection and a high degree of precision in positioning the beam. A purely mechanical beam deflection system can cover a large angular field with high resolution, but the speed or agility of the beam is limited by mechanical inertia. Electro-optical, acousto-optical, and low-inertia mechanical beam deflection systems, and scanning lasers, are all capable of high speeds of deflection, but have a limited number of resolvable angular positions.

Accordingly, there is a need for a beam deflection system capable of rapid operation over a wide angular field, and with a high degree of precision. The present invention satisfies this need.

SUMMARY OF THE INVENTION

The present invention resides in an optical beam deflection system in which the advantages of mechanical beam deflection devices with large deflection angles are combined with the speed of devices capable of deflection through very small angles. In its broadest terms, the invention includes means for scanning a plurality of small fields of view, each containing one or more targets, the fields of view generally being widely separated over a large angular field. The means for scanning these small fields of view includes means for mapping the angular positions of the fields of view into a compact array of subfields that can be rapidly scanned without the inertial limitations usually associated with mechanical scanning systems.

In this specification, the term "scanning" is used in broad sense to include not only continuous or sequential scanning operations, but also discontinuous movements of a beam between desired positions. "Scanning" and "deflecting" are not intended to be limited to angular movements, since a beam may be "scanned" or "deflected" across an array by displacing the beam to any of a plurality of parallel orientations. Similarly, the term "beam deflection" is not intended to be limited to a single beam. There are some applications, to be discussed, in which entire images, represented by multiple beams, are processed by a beam deflection device.

Basically, and in general terms, the beam deflection system of the invention includes a high-speed beam-positioning mechanism, for scanning an optical beam rapidly through a succession of preselected and closely spaced positions, each with a small angular field of view, and an array of focusing elements located to receive the beam at each of the positions and to focus a received beam onto subfields of a focal surface. The system further includes an array of angularly movable optical elements, each positioned to receive the expanded beam in its successive angular positions, and to deflect the beam to one of a plurality of areas in a relatively large angular field of regard, and optionally includes optical means for expanding the optical beam.

The terminology used in the foregoing description of the invention contemplates use of the beam deflection system in conjunction with an optical transmitter, but it will be appreciated as the description proceeds that the invention can also be used in conjunction with an optical receiver, either in an optical radar system or in a communications system. In the context of an optical transmitter, the invention employs a source of light, such as a laser beam. The high-speed scanning mechanism deflects the laser beam through relatively small angles, moving the beam successively from one focusing element to the next, to be focused at each subfield of the focal surface in succession. The optical means in the preferred embodiment of the invention includes a telescope lens or mirror, which expands the beam received from any of the focal surface subfields and produces a succession of beams at angular spacings related to those produced by the high-speed scanning or beam displacement mechanism. The beams from the optical means are directed to corresponding elements in the array of movable optical elements. These may be, for example, gimbaled steering mirrors, each positioned to direct the beam toward a selected cluster of target positions in a large angular field. The mirrors may be controlled to track the movement of a target cluster.

The key advantage of the deflection system of the invention is that optical beams can be deflected quickly from one target cluster to another, even though the clusters are widely spaced in the angular field of the system. Rapid beam deflection is effected by very small lateral displacements, or very small angular deflections of approximately a few degrees or less. Beam deflection within a target cluster is effected by "microscanning" of the beam within each subfield of the focal plane. With appropriate choice of scanner beam diameter and scan angle for the subfields, microscanning of the beam within a subfield can achieve an acceptable number of resolvable beam positions. Microscanning can also be accomplished at high deflection speeds. The angular translation of the beam within a subfield may be equivalent to movement of the beam through smaller angles after passing through the optical means and deflection from the steering mirrors or equivalent devices. Therefore, the angular precision of the deflection system is improved by the magnification factor provided in the optical means.

The high-speed deflection mechanism can employ a fast-scanning mirror, an acousto-optical deflector, a hybrid acousto-optical and electro-optical deflector, or a beam displacement device. Fast-scanning mirrors can achieve switching times in the order of a fraction of a millisecond, which may be sufficiently fast for many applications.

In the context of a receiver, the invention includes a similar array of movable optical elements, such as mirrors, a similar optical telescope lens or mirror, an array of focusing elements, which form an element of the optical telescope, and a high-speed beam deflection device. However, the need for microscanning within each subfield can be satisfied in a receiver by an array of optical detectors. Light impinging on the detector array is switched rapidly from one subfield to another while successively scanning the target clusters. In the receiver mode of operation, light transmitted or reflected from each target is transmitted back through the movable mirror elements, the telescope lens or mirror, and the high-speed beam deflection device, to be finally detected in the detector array. Alternatively, the fast scanning mirror may be completely eliminated in the receiving mode, and multiple detector arrays employed instead. Although this approach requires many more detector elements, these are relatively inexpensive compared to the transmitter cost, and each target can be continuously monitored without any switching delays.

It will be appreciated from the foregoing that the present invention represents a significant advance in the field of optical scanning devices. In particular, the invention provides a technique for scanning a small population of target clusters located in a large angular field, with a high-speed scanning device of the type normally limited to small angular fields of view. Other aspects and advantages of the invention will become apparent from the following more detailed description, taken in conjunction with the accompanying drawings.

DESCRIPTION OF THE PREFERRED EMBODIMENT

As shown in the drawings for purposes of illustration, the present invention is concerned with a system for the deflection of an optical beam over a wide angular field. In optical radar systems there is a need for the ability to scan an optical beam rapidly over wide angular fields, in order to detect, track and designate multiple objects or "targets" in the field. The "targets" may be objects tracked by optical radar, communication receivers and transmitters, or optical images displayed on a screen. Mechanical techniques for steering optical beams can operate rapidly only with small beams over very small angles. For larger beams and angles, mechanical inertia precludes high speed operation. Techniques using electro-optical or acousto-optical devices for beam deflection provide very high speed, but have some transmission loss and are usually limited in the number of resolvable angles that can be accommodated. Furthermore, these devices have optical damage and wave aberration problems at higher powers, and their accurate operation may be dependent on wavelength and temperature.

In accordance with the present invention, mechanical beam deflection is used to operate in a large angular field, but a second type of beam deflection technique is employed to switch rapidly between fields of view that are widely spaced. The invention takes advantage of a commonly occurring situation in radar systems, as well as in other application areas. Although there are multiple targets to be detected and tracked, the targets are typically grouped together in a relatively small number of "clusters," each of which may be scanned within a relatively small field of view.

Figure 1A:
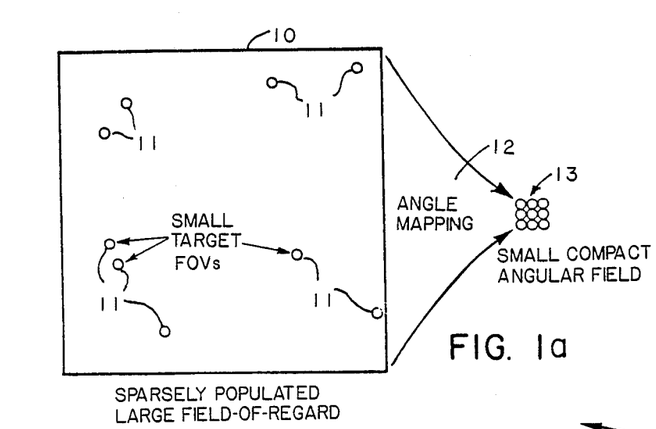
FIG. 1a is a diagrammatic view illustrating the concept of compaction of fields of view in the system of the invention.

This concept is shown in FIG. 1a, in which there is a large angular field of interest, indicated by reference numeral 10 and referred to as the "field of regard" to avoid confusion with the term "field of view." Within the field of regard, there are multiple target fields of view 11, each of which may contain one or more target positions. In a typical situation, the field of regard 10 is sparsely populated with small target fields of view 11. To provide a system that would scan an optical beam over the entire field of regard 10 using conventional techniques is impossible without sacrificing scanning speed. A key aspect of the invention is that the small target fields of view 12 are "angle-mapped", as indicated at 12, into a small and compact angular field 13, which can be rapidly scanned using available beam deflection techniques.

Figure 1B:
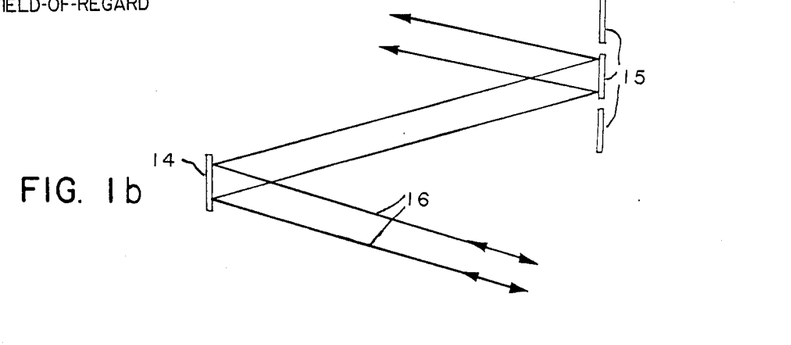
FIG. 1b is a schematic view of an optical beam deflection system embodying the invention in its simplest form.

FIG. 1b shows the invention in its simplest terms, as comprising a single fast-scanning mirror 14 and a plurality of steering mirrors 15. In a transmitter mode, an optical beam 16 from a laser (not shown in FIG. 1b) impinges on the fast-scanning mirror 14 and is reflected onto one of the steering mirrors 15. The key aspect of this arrangement is that the fast-scanning mirror 14 is deflectable through a plurality of relatively small angles, at very high speed and with high precision. The fast-scanning mirror 14 has a plurality of angular positions corresponding to the plurality of steering mirrors 15, and is operated in such a way as to switch the beam sequentially from one mirror 15 to another. The steering mirrors 15 are also angularly movable, but through much larger angles and at a relatively slower speed. Therefore, the steering mirrors 15 can direct the beam to targets that are widely spaced in a large angular field of regard.

It will be observed from FIG. 1b that the angle mapping concept mentioned with reference to FIG. 1a is effected by cooperation of the fast-scanning mirror 14 with the array of steering mirrors 15. The other illustrative embodiments of the inventions are all variations of the same basic principle, in which multiple steerable mirrors are employed to cover a wide angular field of regard, and one or more additional optical elements are employed to scan a single optical beam across the steerable mirrors. As will by now be apparent, the embodiment of the invention shown in FIG. 1a, and the other embodiments to be described, are equally applicable to a receiver mode of operation.

As will be discussed below with reference to the other disclosed embodiments, the fast-scanning mirror 14 is also capable of performing "microscanning" of the beam within the field of view of each of the steering mirrors 15. This permits location of multiple targets within the field of view of each of the steering mirrors 15.

Figure 2:
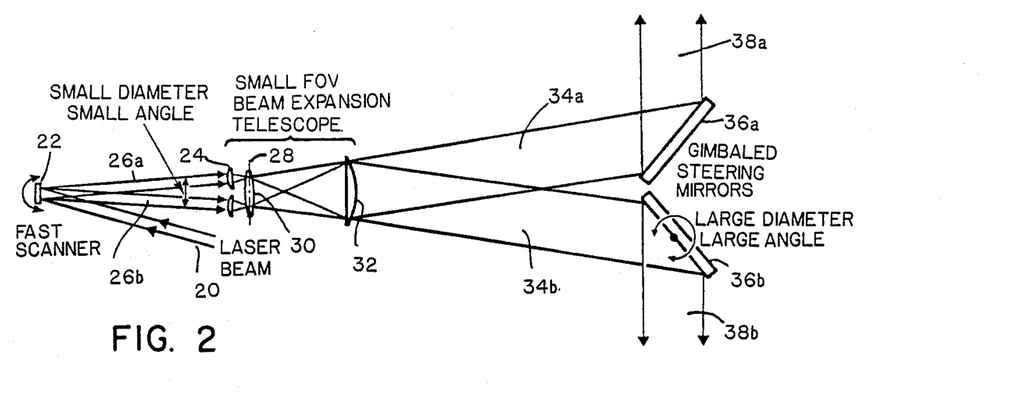
FIG. 2 is schematic view of an optical beam deflection system, in accordance with the invention.

FIG. 2 shows this concept applied to an optical transmitter. A small-diameter laser beam, indicated at 20, is directed onto a fast-scanning mirror 22, by means of which it is deflected through a total scanning angle of only a few degrees. The scanning pattern may be in one dimension or two. For purposes of illustration, it is assumed that the beam is scanned over a two-dimensional array of optical elements 24 referred to as eyepieces, only two of which are shown in FIG. 1. The fast-scanning mirror 22 deflects the beam 20 into one of multiple paths, only two of which are shown at 26a and 26b, and the eyepieces 24 focus the alternate beam paths at a focal plane 28. A lens system, shown as including two lenses 30 and 32, functions with the eyepieces 24 as an expansion telescope, expanding the optical beam in diameter. Thus the beams emerging from the lens 32 follow relatively large-diameter paths, two of which are shown at 34a and 34b.

For any given eyepiece 24, the scanning angles across the field of view of the eyepiece will be reduced by the expansion telescope, in the same ratio as the diameter is expanded. As will shortly be appreciated, this demagnification of the scanning angles for each eyepiece field of view means that targets can be accurately scanned by output beams 34a and 34b, but with less accurate control being required for the angular position of the primary scanned beam at the eyepiece.

The switching angles between eyepieces 24 depends on the distance between the eyepieces and the scanner 22. If this distance is long, the switching angles will be small. The output switching angles, such as the angle between adjacent beam positions 34a and 34b, depend primarily on eyepiece separation and the focal length of the lenses 24, 32, or of a corresponding primary mirror in other configurations. Practical telescopes produce a high-quality beam only over a relatively small angular range. Accordingly, as a practical matter the telescope is designed to produce a switching angle of only a few degrees.

The expanded beams 34a and 34b impinge on separate gimbaled steering mirrors 36a and 36b, which are capable of directing the beams over the large field of regard of the system, as indicated by the beams 38a and 38b. The angular orientations of the mirrors 36a and 36b constitute the angle-mapping parameters of the system. Each mirror 36 directs a beam 38 toward one of the target clusters in the field of regard, and a conventional control system can be employed to allow each of the mirrors 36 to "track" the target cluster as it moves slowly across the field of regard. Although only two mirrors 36a and 36b are shown in FIG. 1, it will be understood that a one-dimensional or two-dimensional array of such mirrors can be employed to provide coverage of an expected number of target clusters in the field of regard. For example, an array of eight-by-eight mirrors can provide adequate coverage in most applications of the system.

Figure 3:
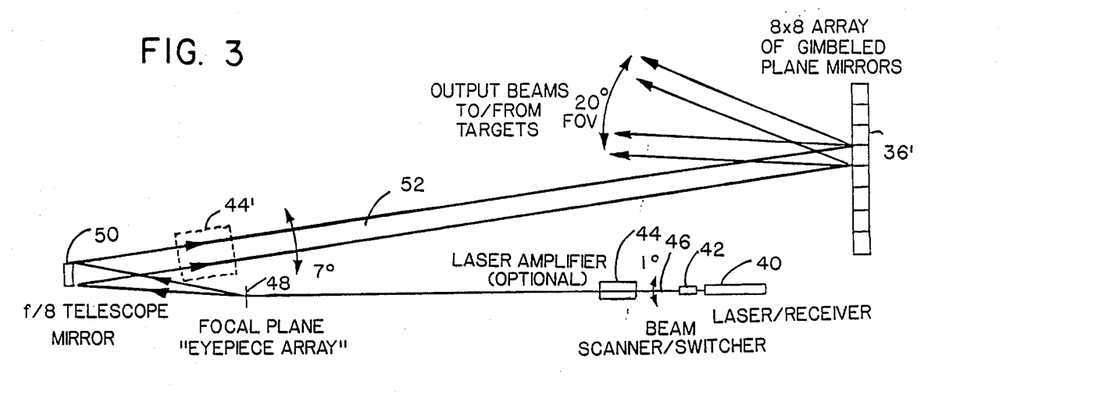
FIG. 3 is a schematic view of another embodiment of the invention.

FIG. 3 shows the system of the invention in a more generalized form, including a laser/receiver 40, a beam scanner/switcher 42 and an optional laser amplifier 44. In a transmission mode, these three elements produce a laser beam that is switchable among multiple beam positions that are separated by angles of the order of only a few degrees, as indicated at 46. The beam is focused onto a focal plane 47 by the eyepiece array 48, each eyepiece in the array cooperating with a telescope mirror 50 to produce expanded multiple beams 52, each of which impinges on one of an array of gimbaled plane mirrors 36'. An alternative location for the laser amplifier 44 is shown at 44', in the paths of the beams 52 from the mirror 50. The first location 44 is preferred because the beam diameter is small, although this limits the amplified power. As in the FIG. 2 embodiment, the mirrors 36' function to direct a small angular field of view, defined by one of the eyepieces in the eyepiece array 48, toward a selected target cluster in the field of regard of the system.

In operation, the beam scanner/switcher 42 has two functions. One is to switch the single laser beam sequentially across all of the eyepieces in the eyepiece array 48. In addition, the beam scanner/switcher performs "microscanning" within the field of view associated with each eyepiece. Therefore, the beam can be scanned in any desired manner over a limited field of view associated with each target cluster position, as defined by the angular position of the mirror array 36'.

Figures 4, 5:
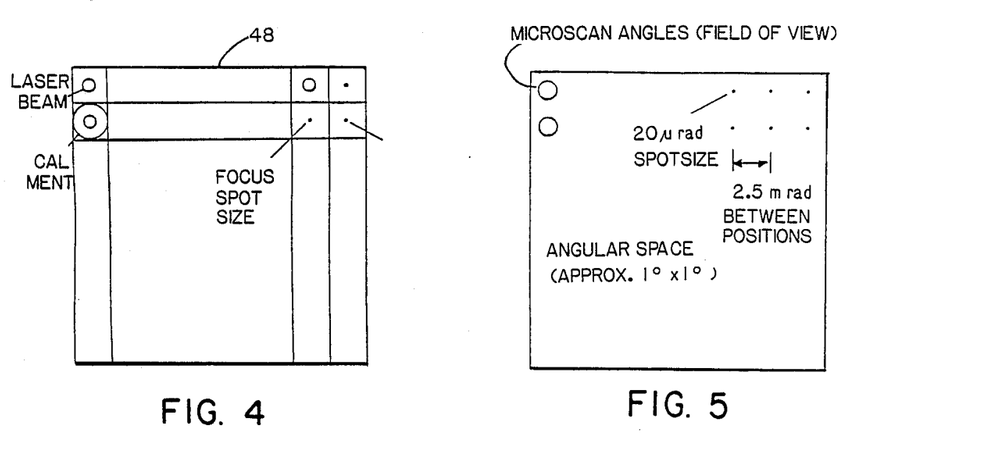
FIG. 4 is a diagrammatic representation of the focal plane of the telescope employed in the system of the invention.
FIG. 5 is a diagrammatic representation of the angular space as viewed from the high-speed beam deflection device.

FIG. 4 shows a possible eyepiece configuration, with an eight-by-eight array of focal elements, which may be lenses or mirrors, forming the "eyepieces" of the expansion telescope in the system. The choice between lenses and mirrors in the system will depend on the power of the laser beams being transmitted, mirrors being the preferred optical elements for higher powers. Another factor influencing this choice is the availability of any technique to correct for off-axis beam aberrations in the apparatus. Reflective elements are achromatic and do not cause specular reflections that could cause difficulty in the receiver mode of operation.

By way of further example, if the laser beam used in the transmission mode is of 50 mm diameter, the focal elements can be 0.139 m in diameter. Each focal element in the example has a focal length of 0.4 m and produces a focal spot of 8 $\mu$m diameter. FIG. 5 shows the corresponding angular space as viewed from the beam switcher/scanner. The overall angular width of the array is one degree and the spacing between adjacent positions in the array is 2.5 mrad (milliradians). The microscanning field of view of the beam from one edge of an array position to the other is a fraction of the inter-position spacing given by the expression (0.139−0.050)/0.139, or approximately 1.6 mrad of the 2.5 mrad spacing. If the focused spot size is 20 μrad, the number of resolvable spots in the field of view is 1.6/0.020 or eighty resolvable spots across the field of view diameter. Accordingly, the beam can be "microscanned" across the field of view of each eyepiece and can identify about eighty resolvable target positions in each direction in the field of view. This is more than enough for many applications.

For most applications of the beam deflection system, switching between the sixty-four mapped positions of the beam can be performed with fast-scanning mirrors operated by mechanical means. Since the beam excursions are limited to less than a degree of arc, the mechanical switches can operate in switching times as fast as a millisecond. Microscanning can be effected with acousto-optical deflectors or by hybrid acousto-optical and electro-optical deflectors, operating in the microsecond speed range. Digital beam deflection can be accomplished with birefringent prisms and polarization switches. A birefringent prism produces a beam deflection that is dependent on the polarization of the beam. By switching the polarization the beam deflection is controlled to produce desired incremental swings of the beam. The individual eyepiece focal elements can be controlled in position by conventional mechanical means, to correct for systematic errors in the system, including drift in alignment and low-frequency vibrations.

Operation of the beam deflection system in its receiving mode is not significantly different from its operation in the transmission mode. Light reflected from a distant target is received by one of the deflectable mirrors, which has been positioned to track the target. The light is reflected from the deflectable mirror and back through the expansion telescope to an element of the focal plane array corresponding to the deflectable mirror from which the light was received. In the receiving mode, the position of the target within the field of view of the focal element may be easily determined by employing an array of light detectors in the focal plane position, instead of scanning the field of view with a single detector.

Figure 6:
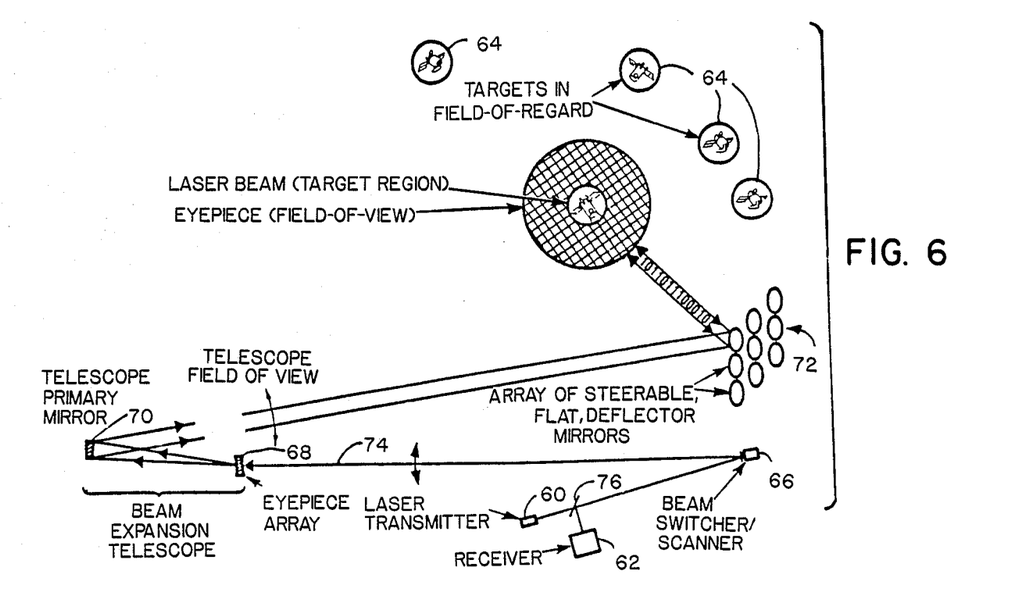
FIG. 6 is a diagrammatic view of communications apparatus employing the optical beam deflection system of the invention.

FIG. 6 illustrates the invention as applied to a communications system, including a laser transmitter 60, and a receiver 62, which communicate with multiple "targets" in the form of communications satellites, shown diagrammatically at 64. The beam deflection system includes a beam switcher/scanner 66, an eyepiece array 68, a telescope mirror 70, and an array of steerable mirrors 72. As in the optical radar application, the steerable mirrors 72 are movable through large angles but at a relatively slow speed, to track the targets 64. The beam switcher/scanner 66 switches an optical beam 74 from element to element within the eyepiece array 68, which has the effect of switching the optical beam emerging from the telescope mirror 70 through somewhat larger angles between corresponding steerable mirrors 72. As shown in the figure, each target 64 may be centered in a field of view of the eyepiece, or there may be multiple targets in a single field of view, the multiple targets being identified by microscanning within each field of view, as described with reference to FIGS. 4 and 5. The diagrammatic representation of FIG. 6 is exaggerated in some respects for purposes of illustration. For example, the optical beam in the communications system may have an angular diameter of only a few seconds of arc, while the field of view of each eyepiece in the array 68 is typically about a hundred times this angle. The field of regard may be as large as a complete hemisphere, or larger if additional mirrors are used.

Operation of the apparatus of FIG. 6 in a receiver mode is similar to operation in the transmitter mode, except that the directions of the optical beams are reversed. Light reaches the receiver 62 by any conventional means, such as a beam splitter 76 positioned to intercept the return beam from the beam switcher/scanner 66 and divert a portion or all of its energy to the receiver.

Figure 7:
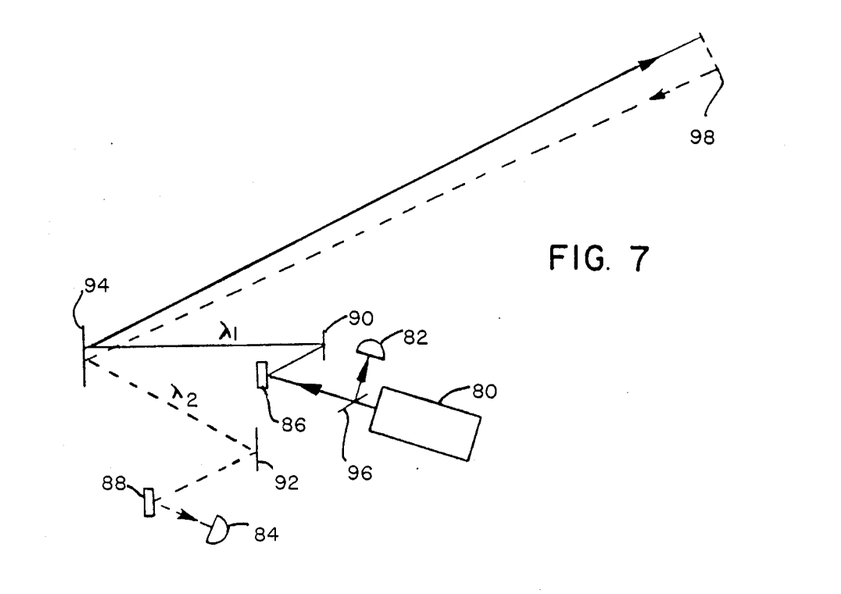
FIG. 7 is a fragmentary diagrammatic view of communications apparatus in accordance with the invention, employing wavelength multiplexing to provide additional capability.

FIG. 7 a system with full-duplex capability for communication, i.e. the capability of simultaneously transmitting and receiving. A problem in any duplexed system is to isolate the sensitive receiver from the high-power laser beam used in transmitting. With a pulsed radar system, the transmitted energy and the received energy are at the same wavelength, ignoring any small Doppler shifts that may be present. Also, because the system is pulsed the receiver can be inactivated during the transmitter pulse. In the communications system illustrated, different wavelengths are employed for transmitting and receiving. The communications path indicated by a solid line represents a transmitted beam at one wavelength, and the communications path indicated by a broken line represents a received beam at a different wavelength.

The system shown in FIG. 7 includes a communications transmitter 80, a communications receiver 82 operating at the same wavelength as the transmitter, a communications receiver 84 operating at a different wavelength, a first scanning mirror 86, a second scanning mirror 88, three reflective diffraction gratings 90, 92 and 94, a beam splitter 96, and an eyepiece array 98. A transmitted beam from the transmitter 80 passes through the beam splitter 96 and is reflected from the first scanning mirror 86, and then reflected from the reflective diffraction grating 90, and from the reflective diffraction grating 94 onto one of the elements of the eyepiece array 98. The return path from the eyepiece array 98 is shown as beginning at a different eyepiece, reflecting from the grating 94 onto the third grating 92, and from there to the second scanning mirror 88 and into the receiver 84.

The paths shown to and from the eyepiece array 98 are arbitrarily chosen for purposes of illustration. Both the transmitted beam and the received beam can address any selected element of the array 98, and may both address the same element at the same time. The gratings 90, 92 and 94 reflect light at an angle that is wavelength dependent. Therefore, although the transmitted and received beams to and from the array 92 are separated by only a small angle, and may be coincident if the same element is addressed for both sending and receiving, the two beams are widely separated by the action of the grating 94, which permits separation of the transmitted and received beams. The received beam is processed by the grating 92 and the second scanning mirror 88, while the transmitted beam is processed by the other grating 90 and the first scanning mirror 86.

The gratings 90 and 92 are required only to compensate for angular errors that can arise from drift in the wavelength of the transmitted or the received beam, which might result from temperature changes or aging of components. All of the gratings 90, 92 and 94 are oriented parallel to each other. Therefore, wavelength drift will produce compensating effects in the two gratings 94 and 90, and the beam from the scanning mirror 86 to the grating 90 will always be parallel to the beam from the grating 94 to the eyepiece array 98. Similarly, the received beam from the grating 92 to the scanning mirror 88 will always be parallel to the beam from the eyepiece array 98 to the grating 94.

Because the transmitted and received beams are effectively separated by frequency, the system can receive at one wavelength and transmit at another at the same time. Furthermore, because the received beam is separated at the grating 94 before it reaches a scanning mirror, the two beams can be switched and scanned independently.

If any of the targets carry beacon transmitters operating at the wavelength of the receiver 84, data received by the receiver 84 can be used to update the angular locations of the targets, to reduce tracking errors to a minimum. An optional feature is the operation of the receiver 82 at the same frequency as the transmitter 80, separating the received transmission by means of the beam splitter 96. This approach permits operation in a half-duplex mode, in which transmission and reception must take place at different times.

Figure 8:
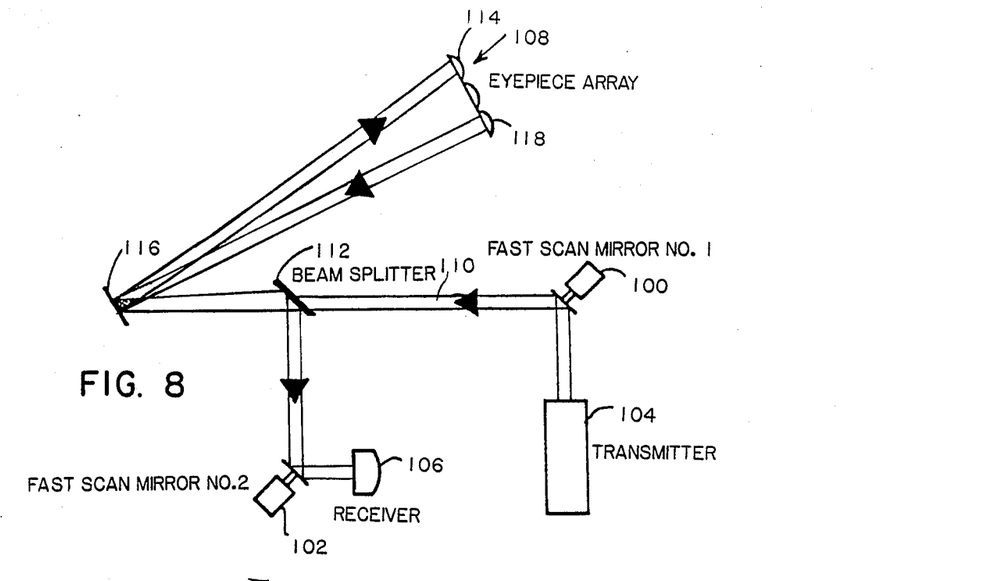
FIG. 8 is a fragmentary diagrammatic view of communications apparatus in accordance with the invention, having simultaneous transmission and reception capability.

FIG. 8 illustrates another variation of the invention as applied to optical radar apparatus. As in the embodiment described with reference to FIG. 7, the use of two fast scanning mirrors 100 and 102 allows independent pointing of transmitted and received beams. One scanning mirror 100 operates only in conjunction with a transmitted beam from a transmitter 104, and the other scanning mirror operates only in conjunction with a received beam destined for a receiver 106. The transmitted and received beams share the same eyepiece array 108, the object of this embodiment being to permit independent transmission and reception of signals, involving different eyepiece elements and different targets. The scanning mirrors 100 and 102 operate independently, and can address different eyepiece elements or the same eyepiece element at any instant of time. Because there is a propagation delay time between the transmission of a pulse and its receipt at a target, it is desirable to point the received beam in such a manner that it scans the targets in a scan sequence that lags behind the scan sequence of the transmitted beam. By way of example, the figure shows a transmitted beam 110 directed from scanning mirror 100, through a beam splitter 112 and onto an element 114 of the eyepiece array 108, via mirror 116. A received beam is shown extending from eyepiece element 118, reflected from the same mirror 116, reflected by the beam splitter 112, and then reflected by the second scanning mirror 102 into the receiver 106.

Figures 9, 10:
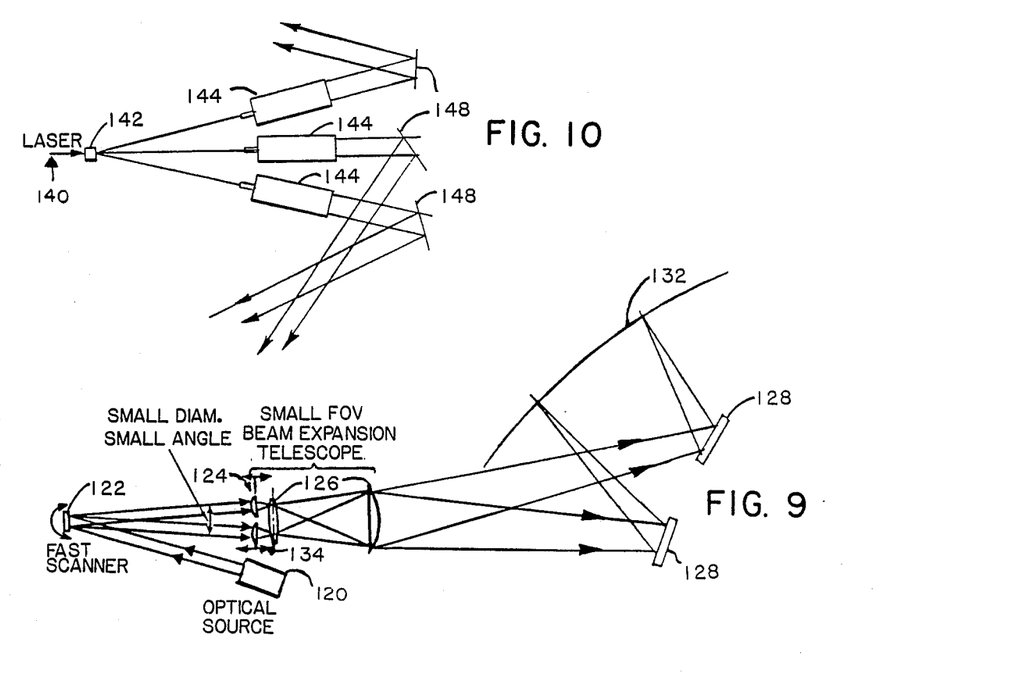
FIG. 9 is a diagrammatic view of optical display apparatus using the principles of the invention.
FIG. 10 is a diagrammatic view of yet another embodiment of the invention, employing multiple telescopes.

FIG. 9 illustrates yet another application of the beam deflection system of the invention. Specifically, the system includes an optical source 120, a beam switcher/scanner 122, an eyepiece array 124, and an expansion telescope, with lenses 126. As in the systems described above, light from the source 120 is deflected rapidly from one element to another of the eyepiece array 124, and thence to the corresponding elements of a steerable mirror array 128. The latter elements are steerable through large angles, and are employed to define a plurality of focused target images 130 on a projection screen 132. As indicated by the arrows 134, the axial positions of the eyepiece elements 124 are adjustable to focus the images on the screen 132. This ability to focus the individual images also permits the steering mirrors 128 to be moved to any position needed to produce the desired images in perfect focus. The optical beam can be microscanned within each eyepiece field of view to define a desired projected image, and the images can be moved at a relatively slow speed by the steerable mirrors 128. Such a system may be used, for example, to display multiple moving images in a flight simulator, using only a single light beam source under computer control.

The optical source can be either a laser that is rapidly scanned by the scanner 122 to produce the desired images, or an imaging light source, such as cathode ray tube or other video display device, that is imaged through the telescope and onto the screen 132, via the mirrors 128. If such an imaging light source is used, the scanner may be used solely for beam switching between mirrors 128, or maybe used to perform some of the scanning operations required by the video source.

FIG. 10 is yet another embodiment of the invention, having a laser 140, a single fast beam scanner 142, multiple telescopes 144, and an array of steerable mirrors 148. This arrangement differs from FIG. 1b in that beam expansion is provided by the telescopes 144, and it differs from FIG. 2 in that multiple telescopes are used rather than a single telescope. Although multiple telescopes may be more expensive, and heavier, than a single telescope, the arrangement of FIG. 10 may be useful in some applications, especially if the beam size is not too large, such as less than approximately one inch (2.54 cm).

It will be appreciated from the foregoing that the present invention represents a significant advance in the field of optical deflection systems for use in optical radar, communications, and optical projection equipment. In particular, the invention provides a novel technique for scanning multiple target clusters that are scattered over a wide angular field, without sacrificing speed or precision of operation. The key to the invention lies in its use of a high-speed switcher that need achieve switching angles of only as much as a few degrees to provide coverage of multiple fields of view scattered within an extremely large field of regard, in combination with a microscanning deflector that need be capable of switching between only a modest number of positions within each field of view. It will also be appreciated that, although an embodiment of the invention has been described in detail for purposes of illustration, various modifications may be made without departing from the spirit and scope of the invention. Accordingly, the invention is not to be limited except as by the appended claims.

I claim:

1. An optical beam deflection system, comprising:
   first beam deflection means, for deflecting one or more optical beams rapidly through small increments to direct the beams successively to any subfields of view selected from a plurality of N subfields of view, where N is greater than the number of optical beams, and to point the beams as desired within each subfield of view; and
   second beam deflection means having an equal plurality of N optical elements arrayed in the corresponding subfields of view to receive the beams from the first beam deflection means, wherein the angular positions of the optical elements are selected to direct the optical beams successively to desired target areas in a relatively large angular field of regard.

2. An optical beam deflection system as defined in claim 1, and further including:
a plurality of focusing elements, each individually controllable, for focusing the beams in the plurality of subfields.

3. An optical beam deflection system as defined in claim 2, and further comprising:
at least one beam expansion telescope located between the first and second beam deflection means.

4. An optical beam deflection system as defined in claim 3, wherein:
there are a plurality of beam expansion telescopes, one for each subfield of view.

5. An optical beam deflection system as defined in claim 1, wherein:
the optical elements in the second beam deflection means are steerable mirrors.

6. An optical beam deflection system as defined in claim 3, and further including:
a plurality of focusing elements, each individually controllable, for focusing the beams in the plurality of subfields.

7. An optical beam deflection system as defined in claim 6, and further comprising:
at least one beam expansion telescope located between the first and second beam deflection means.

8. An optical beam deflection system as defined in claim 7, wherein:
there are a plurality of beam expansion telescopes, one for each subfield of view.

9. An optical beam deflection system as defined in claim 5, and further comprising:
at least one beam expansion telescope located between the first and second beam deflection means.

10. An optical beam deflection system as defined in claim 9, wherein:
there are a plurality of beam expansion telescopes, one for each subfield of view.

11. An optical beam deflection system as defined in claim 1, and further comprising:
at least one beam expansion telescope located between the first and second beam deflection means.

12. An optical beam deflection system as defined in claim 11, wherein:
there are a plurality of beam expansion telescopes, one for each subfield of view.

13. An optical beam deflection system, comprising:
a high-speed beam-pointing mechanism, for switching an optical beam rapidly through a succession of preselected discrete angular positions, each position having associated with it a smaller angular field of view and separated form neighboring fields of view by relatively small angles;
an array of focusing elements located to receive the beam at each of the angular positions and to focus the beam for each field of view onto a focal surface;
an array of optical elements each positioned to receive a beam from one of the focusing elements, wherein the angular orientations of the optical elements are selected to direct the optical beam successively to desired target areas in a relatively large angular field of regard; and
beam telescope means disposed between the array of focusing elements and the array of optical elements.

14. An optical beam deflection system as defined in claim 13, wherein:
the beam telescope means is a single expansion telescope shared by all of the focusing elements.

15. An optical beam deflection system as defined in claim 13, wherein:
the optical elements are angularly steerable to track moving target positions in the field of regard.

16. An optical beam deflection system as defined in claim 13, wherein:
the system is used in conjunction with a beam transmitter; and
the beam transmitter is positioned to direct a light beam onto the high-speed scanning mechanism.

17. An optical beam deflection system as defined in claim 13, wherein:
the optical elements are steerable mirrors.

18. An optical beam receiver system, comprising:
an array of optical elements positioned to receive optical beams form target positions, each of which is located within one of a plurality of fields of view in a large angular field of regard, the optical elements being movable independently to track the target position, and oriented in such a manner as to deflect the optical beams from the plurality of fields of view along a group of closely spaced and more nearly parallel paths;
beam telescope means disposed in the more nearly parallel beam paths to focus the received beams;
optical detection means, for detecting the received beams emerging from the beam telescope means, and locating each target by the field of view with which it is associated and its position within the field of view; and
wherein the optical detection means includes an optical detector and a high-speed beam pointing device, for scanning the separate fields of view in turn with the optical detector.

19. An optical beam deflection system, comprising:
an array of focusing elements positioned to focus incident optical beams onto corresponding subfields of a focal surface;
first beam deflection means, for deflecting an optical beam rapidly through small increments to move the beam from one focusing element to another;
second beam deflection means having a plurality of steerable optical elements capable of movement through relatively large angles; and
optical means for directing an optical beam from each subfield of the focal surface onto a corresponding one of the plurality of steerable optical elements;
wherein the angular positions of the steerable optical elements are selected to direct an optical beam successively to desired target areas in a relatively large angular field.

20. An optical beam deflection system as defined in claim 19, wherein:
the first beam deflection means includes means for scanning a beam rapidly from one focusing element to another, and means for scanning the beam by much smaller angles within the field of view of each focusing element, to produce a corresponding scan of the field of view of each steerable optical element.

21. An optical beam deflection system as defined in claim 19, wherein:
the system is used in conjunction with a beam transmitter; and
the beam transmitter is positioned to direct a light beam onto the first beam deflection means.

22. An optical beam deflection system as defined in claim 19, wherein:
   the system is used in conjunction with a beam transmitter; and
   the beam transmitter is integrated into the first deflection means.

23. An optical beam deflection system as defined in claim 19, wherein:
   the system is used in conjunction with an optical receiver; and
   a received light beam from a selected target field of view in the large field of regard is transmitted to one or more of the steerable optical elements and thence through the optical means, one of the focusing elements, and the first beam scanning mechanism, to be received in the optical receiver.

24. An optical beam deflection system as defined in claim 19, wherein:
   the array of focusing elements is a two-dimensional array of lenses.

25. An optical beam deflection system as defined in claim 24, wherein:
   the optical means includes an expansion telescope mirror.

26. An optical beam deflection system as defined in claim 27, wherein:
   the optical means includes an expansion telescope mirror.

27. An optical beam deflection system as defined in claim 19, wherein:
   the array of focusing elements is a two-dimensional array of mirrors.

28. An optical radar system having the ability to rapidly scan multiple targets in a wide angular field of regard, the system comprising:
   an optical transmitter providing a source optical laser beam;
   a high-speed beam-scanning mechanism, for scanning the optical beam rapidly through a succession of preselected angular positions, each with a small angular field of view and separated by relatively small angles;
   an array of focusing elements located to receive the beam at each of the angular positions and to focus a received beam onto subfields of a focal plane;
   optical means for expanding the angular field of the optical beam and expanding the angular spacing between its successive positions;
   an array of angularly movable optical elements each positioned to receive the expanded beam in its expanded successive angular positions, and deflecting the beam to one of a plurality of areas in a relatively large angular field of regard; and
   an optical receiver, positioned to receive light reflected or transmitted from targets and transmitted via at least one of the movable optical elements, the optical means, at least one of the array of focusing elements, and the high-speed scanning mechanism.

29. An optical radar system as defined in claim 28, wherein:
   the optical receiver includes a plurality of detector arrays for simultaneous monitoring of optical beams received from a plurality of targets in a plurality of fields of view.

30. An optical radar system as defined in claim 28, wherein the optical receiver includes:
   a detector array for simultaneously monitoring optical beams received from a plurality of targets from an entire field of view; and
   means for optically selecting which of the fields of view is directed to the detector array, to permit monitoring of optical beams recieved from a plurality of targets in a plurality of fields of view in an entire field of regard.

31. An optical radar system as defined in claim 28, wherein:
   the beam scanning mechanism includes means for scanning the beam through a number of angular positions within the field of view of each of the focusing elements.

32. An optical radar system as defined in claim 31, wherein:
   the angularly movable optical elements are steerable mirrors.

33. An optical communications system as defined in claim 28, wherein:
   the beam scanning mechanism includes means for scanning the beam through a number of angular positions within the field of view of each of the focusing elements.

34. An optical communications system for communication with multiple transmitter/receivers that can be widely scattered across a large angular field of regard, the system comprising:
   an optical transmitter providing a source optical laser beam;
   a high-speed beam-scanning mechanism, for scanning the optical beam rapidly through a succession of preselected and relatively closely spaced beam positions, each with a small angular field of view;
   an array of focusing elements located to receive the beam at each of the beam positions and to focus a received beam onto subfields of a focal plane;
   optical means for expanding the optical beam;
   an array of angularly movable optical elements each positioned to receive the expanded beam in its successive beam positions, and deflecting the beam to one of a plurality of areas in a relatively large angular field of regard; and
   an optical receiver, positioned to receive light beams transmitted from targets via the movable optical elements, the optical means, and the array of focusing elements.

35. An optical communications system as defined in claim 34, wherein:
   the angularly movable optical elements are steerable mirrors.

36. An optical communications system as defined in claim 35, and further including:
   a second high-speed beam-scanning mechanism;
   means for guiding received beams into the second beam-scanning mechanism, for deflection into the optical receiver.

37. An optical communications system as defined in claim 35, and further comprising:
   a second high-speed beam-scanning mechanism;
   a reflection grating providing a deflection angle dependent on the wavelength of the optical beam impinging on it, and positioned to discriminate between transmitted signals of different wavelengths received from the transmitter/receivers;
   a second optical receiver operating at a different wavelength from the first optical receiver;

whereby the system is capable of simultaneously receiving signals for one purpose at the second optical receiver, and transmitting or receiving other signals at a different wavelength.

38. An optical communications system as defined in claim 37, and further comprising:
a second reflection grating disposed in the path of transmitted optical beams, to compensate for unwanted changes in wavelength of the transmitted beams; and
a third reflection grating disposed in the path of received optical beams, to compensate for unwanted changes in wavelength of the received beams.

39. An optical display system for producing multiple images over a relatively wide angular field, the system comprising:
an optical source for producing one or more optical beams;
a high-speed beam-switching mechanism, for switching the optical beams from the source rapidly from one to another of a succession of preselected and relatively closely spaced, discrete beam positions, each such beam position being associated with a separate subfield with a small angular field of view;
an array of independently adjustable focusing elements located to receive the beams at each of the beam positions and to focus the beams independently;
an array of angularly movable optical elements each positioned to receive the beams in their successive beam positions, and angularly oriented to deflect the beams to selected ones of a plurality of areas in a relatively large angular field of regard; and
a display screen positioned to receive the independently focused beams deflected from the movable optical elements, to produce a plurality of images at selected positions on the screen.

40. An optical display system as defined in claim 39, wherein:
the optical source includes a laser and all of the resultant images are produced by appropriately scanning the laser beam.

41. An optical display system as defined in claim 41, wherein:
the optical source includes video imaging apparatus, and the high-speed beam-switching mechanism switches a video image rapidly between the movable optical elements.

42. An optical display system as defined in claim 39, and further comprising:
at least one beam telescope located in the beam path to the array of angularly movable optical elements.

43. An optical beam receiver system, comprising:
an array of optical elements positioned to receive optical beams from target positions, each of which is located within one of a plurality of fields of view in a large angular field of regard, the optical elements being oriented in such a manner as to deflect the optical beams form the plurality of fields of view along a group of closely spaced and more nearly parallel paths;
beam telescope means disposed in the more nearly parallel beam paths to focus the received beams;
optical detection means, for detecting the received beams emerging form the beam telescope means, and locating each target by the field of view with which it is associated and its position within the field of view;
wherein the optical detection means includes a plurality of detector arrays, one array for each of the fields of view, and each detector array can simultaneously monitor received optical beams from an entire field of view, and the plurality of detector arrays can monitor the optical beams received from the entire field of regard.

44. An optical beam receiver system, comprising:
an array of optical elements positioned to receive optical beams form target positions, each of which is located within one of a plurality of fields of view in a large angular field of regard, the optical elements being oriented in such a manner as to deflect the optical beams form the plurality of fields of view along a group of closely spaced and more nearly parallel paths;
beam telescope means disposed in the more nearly parallel beam paths to focus the received beams;
optical detection means, for detecting the received beams emerging form the beam telescope means, and locating each target by the field of view with which it is associated and its position within the field of view;
wherein the optical detection means includes a detector array for simultaneously monitoring received optical beams from an entire field of view, and means for optically selecting which of the fields of view is directed to the detector array, to permit monitoring of the entire field of regard.

45. An optical beam deflection system, comprising:
a high-speed beam-pointing mechanism, for switching an optical beam rapidly through a succession of preselected angular positions, each position having associated with it a small angular field of view and separated from neighboring fields of view by relatively small angles;
an array of focusing elements located to receive the beam at each of the angular positions and to focus the beam for each field of view onto a focal surface;
an array of optical elements each positioned to receive a beam form one of the focusing elements, wherein the angular positions of the optical elements are selected to direct the optical beams successively to desired target areas in a relatively large angular field of regard; and
beam telescope means disposed between the array of focusing elements and the array of optical elements;
and wherein the beam telescope means includes a plurality of expansion telescopes, one disposed between each focusing element and each optical element.

46. An optical beam deflection system, comprising:
a high-speed beam-pointing mechanism, for switching an optical beam rapidly through a succession of preselected angular positions, each position having associated with it a small angular field of view and separated from neighboring fields of view by relatively small angles;
an array of focusing elements located to receive the beam at each of the angular positions and to focus the beam for each field of view onto a focal surface;
an array of optical elements each positioned to receive a beam from one of the focusing elements, wherein the angular positions of the optical elements are selected to direct the optical beams successively to desired target areas in a relatively large angular field of regard; and beam telescope means disposed between the array of focusing elements and the array of optical elements;

and wherein the beam telescope means includes plurality of expansion telescopes, one disposed between each focusing element and each optical element;

and wherein the high-speed scanning mechanism includes means for pointing the beam to a plurality of selected positions within each filed of view, to permit scanning of multiple target positions within each filed of view.

47. An optical beam deflection system, comprising:

a high-speed beam-pointing mechanism, for switching an optical beam rapidly through a succession of preselected angular positions, each position having associated with it a small angular field of view and separated from neighboring fields of view by relatively small angles;

an array of focusing elements located to receive the beam at each of the angular positions and to focus the beam for each field of view onto a focal surface;

an array of optical elements each positioned to receive a beam from one of the focusing elements, wherein the angular positions of the optical elements are selected to direct the optical beams successively to desired target areas in a relatively large angular field of regard; and beam telescope means disposed between the array of focusing elements and the array of optical elements;

and wherein the beam telescope means includes a plurality of expansion telescopes, one disposed between each focusing element and each optical element;

and wherein the array of focusing elements is a two-dimensional array of lenses.

48. An optical beam deflection system, comprising:

a high-speed beam-pointing mechanism, for switching an optical beam rapidly through a succession of preselected and relatively closely spaced beam positions, each position having associated with it a small angular field of view;

an array of focusing elements located to receive the beam at each of the beam positions and to focus the beam for each field of view onto a focal surface;

an array of optical elements each positioned to receive a beam form one of the focusing elements, wherein the angular positions of the optical elements are selected to direct the optical beams successively to desired target areas in a relatively large angular field of regard; and beam telescope means associated with the array of focusing elements;

wherein the system is used in conjunction with an optical receiver, and a received light beam from a selected field of view in the large field of regard is transmitted to one or more of the optical elements and thence through the beam telescope means, one of the focusing elements, and the high-speed beam-pointing mechanism, to be received in the optical receiver.

* * * * *